Jan. 4, 1966 R. H. SVENSSON 3,227,490
SAFETY BELT AND LOCK FOR SAME
Filed May 27, 1963

Inventor:
Rolf Henrik Svensson
By: [signature]
Attorney

United States Patent Office 3,227,490
Patented Jan. 4, 1966

3,227,490
SAFETY BELT AND LOCK FOR SAME
Rolf Henrik Svensson, 1 Victoriagatan,
Halmstad, Sweden
Filed May 27, 1963, Ser. No. 283,175
2 Claims. (Cl. 297—389)

My invention relates to safety belts which may be used for example by people travelling in road and other vehicles.

Various forms of seat safety belts have been proposed including lap, diagonal-lap and full harnesses, and it is an object of this invention to provide a lock for use with such belts.

According to a main feature of my invention, I provide a lock for detachably connecting two belts, for example seat safety belts for road and other vehicles, the lock including a frame, means for attaching a first belt to the frame, an arm angularly movable relatively to the frame and a releasable catch which, when open, permits a second belt to be looped over the arm and, when closed, holds the arm fixed relative to the frame to retain the second belt in the lock.

In a preferred form of my invention, the lock includes an L-shaped frame, means for attaching a first belt to the frame, an arm angularly movable relatively to one leg of the L frame and a releasable catch carried by the other leg of the L frame, the catch, when open, permitting a second belt to be looped over the arm and, when closed, holding the arm fixed relative to the frame to retain the second belt in the lock. Preferably the arm is pivoted to one leg of the L frame at a point remote from the junction between the two legs of the L frame.

My invention also includes a combined diagonal-lap seat safety belt having a lock in accordance with the above and having attachments for a conventional three-point anchorage in a road or other vehicle, comprising a first belt attached at one end to the lock and at the other end to a first anchorage normally located at one side of and below the seat, the lock, in use, being disposed in the region of that thigh of a seated person adjacent the first anchorage, a second belt attached at its ends to second and third anchorages disposed on that side of the seat opposite from the first anchorage and located above and below the seat respectively, so that, when the safety belt is worn by a seated person, the second belt extends diagonally downwardly from the second anchorage to the lock and from the lock across the person's lap to the third anchorage.

Further objects and advantages of my invention will become evident from the following description considered in connection with the accompanying drawings which form part of this specification and in which.

Figure 1:
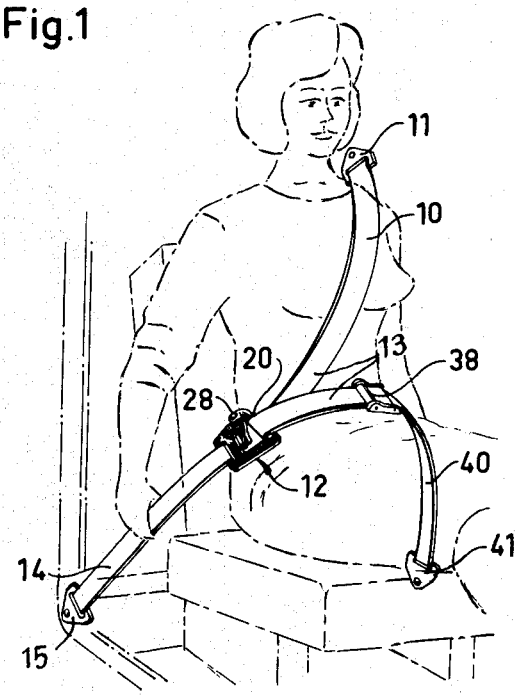
FIGURE 1 shows a perspective of the safety belt when in use.

In FIGURE 1, 10 generally denotes a belt which extends from an anchor point 11, located on a door pillar or adjacent the roof of a car body on the outer side of a seated person, diagonally downwards over the person's thorax to a lock 12 located adjacent the person's inside hip. From the lock 12 the belt 10 is folded backwards across the person's lap towards a floor anchor point 41 also located on the outer side of the seat. Another belt 14 is fixed to an anchor point 15, which is located on the opposite side of the seat from anchor point 41, and extends diagonally upwardly to the lock 12.

Figure 2:
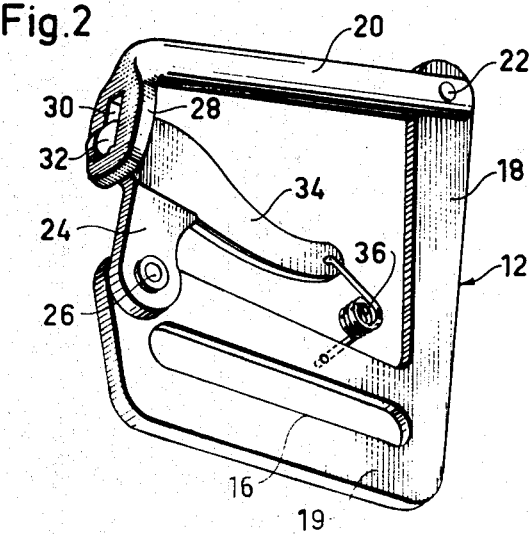
FIGURE 2 is a perspective of the lock on an enlarged scale.

The lock 12 is shown in greater detail in FIGURE 2 and has an elongated slot 16 through which the uppermost end portion of the belt 14 is passed and undetachably secured. The slot 16 is formed in one leg 19 of a substantially L-shaped frame; and the other leg 18 carries an arm 20 which is pivotally mounted on a pin 22. A catch generally denoted at 24 is pivotally mounted on a pin 26 which is supported in the leg 19 of the lock. The arm 20 has a flattened lug 28 bent at an angle less than 90° with respect to the arm; and the lug has a slot 30 to receive a crook-shaped hook 32. The hook 32 is formed at one end of an arm 34 of the catch 24; and the arm 34 is biased by a spring 36 to turn the catch counter-clockwise as viewed in FIGURE 2. The spring, as shown has its ends located in the arm 34 and leg 19 respectively. By depressing the arm 34 clockwise towards the leg 19, a user compresses the spring 36 and moves the hook 32 into a position where the lug 28 is released from the hook. In the locked position of FIGURE 2, the hook 32 engages in the aperture 30 due to action of the spring 36; and the arm 20 is, therefore, locked relative to the catch 24. In the locked position the arm 20 forms an angle with the leg 18 which is slightly greater than 90°.

The belt generally denoted 10 is made in two portions 13 and 40 which are attached to each other by a buckle 38. The buckle 38 is of a type allowing adjustment of the two belts 13, 40 to any desired position in which they are held against separation by friction forces. The main portion of the belt 10, namely belt 13, extends as described above over a seated person's thorax to the lock 12, around the arm 20 of the lock and from there to the buckle 38, whereas the belt portion 40 is attached to the buckle 38 and anchored at a point 41 located low in the car.

One form of buckle 38 is described and claimed in my copending patent application Serial No. 184,775 filed April 3, 1962; and the use of such a buckle enables the combined length of belts 13 and 40 to be adjusted as desired by the user.

As described above, the lock 12 may be released by depressing the arm 34 against the bias of spring 36 to release the catch 24. When the catch 24 has been released the belt part 13 can be totally removed from the lock 12. The lock 12, therefore, is also a release mechanism, and the buckle 38 need not be adjusted unless it is required to change the total length of the belt portions 13 and 40, for example when another person of different size wishes to use the safety belt.

While one more or less specific embodiment of my invention has been shown and described, it is to be understood that this is for purpose of illustration only and that my invention is not to be limited thereby, but its scope is to be determined by the appended claims.

What I claim is:
1. A safety belt for releasably securing an occupant in a seat of a vehicle, comprising
    (a) a first belt fixed at one end thereof at one side of the seat,
    (b) a releasable lock secured to the other end of said belt to be adjacent one hip of the occupant when the seat is occupied and the belt is in use,
    (c) said lock comprising a fixed part to which said other end of said first belt is fixedly secured, an arm pivoted at one end of said fixed part, and a manually releasable latch for securing the opposite end of said arm in locked position,
    (d) a second belt secured at one end in the upper part of the car to extend over one shoulder of the occupant of the seat and diagonally over the occupant's thorax to said lock and around and over said arm and over the occupant's lap and being fixed at its other end at the side of the seat opposite to that at which said first belt is fixed,

(e) said second belt being divided intermediate its ends into two parts, and
(f) a buckle disposed between said lock and said other end of said second belt and releasably connecting the two parts of said second belt together to permit adjustment of the length of said second belt,
(g) said arm, when released from locked position, permitting removal of said second belt from engagement with said lock without releasing said buckle.

2. A safety belt as claimed in claim 1, wherein
(a) said fixed part of said lock is a generally L-shaped member, to one leg of which said other end of said first belt is secured, and to the other leg of which said arm is pivoted at the end of said other leg which is remote from the juncture of said legs,
(b) said arm has a slot in its free end, and
(c) said latch is a spring loaded detent which is pivotally mounted on said one leg at the end thereof remote from the juncture of said legs and is releasably engageable in said slot to releasably hold said arm in locked position.

References Cited by the Examiner
UNITED STATES PATENTS

| | | | |
|---|---|---|---|
| 1,898,090 | 2/1933 | Lethern | 297—389 |
| 2,664,610 | 1/1954 | Hannemann | 24—201.4 |
| 2,710,649 | 6/1955 | Griswold | 297—389 |
| 3,043,625 | 7/1962 | Bohlin | 297—389 |
| 3,125,376 | 3/1964 | Van Duijvendijk | 297—389 |

FRANK B. SHERRY, *Primary Examiner.*